United States Patent
Malladi

(10) Patent No.: US 9,143,281 B2
(45) Date of Patent: Sep. 22, 2015

(54) BLIND DECODING OF UPLINK CONTROL CHANNELS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1597 days.

(21) Appl. No.: 12/576,867

(22) Filed: Oct. 9, 2009

(65) Prior Publication Data

US 2011/0085502 A1    Apr. 14, 2011

(51) Int. Cl.
| | |
|---|---|
| H04W 4/00 | (2009.01) |
| H04L 1/16 | (2006.01) |
| H04L 1/00 | (2006.01) |
| H04W 72/04 | (2009.01) |
| H04W 72/12 | (2009.01) |

(52) U.S. Cl.
CPC .............. *H04L 1/1664* (2013.01); *H04L 1/003* (2013.01); *H04L 1/0026* (2013.01); *H04L 1/0027* (2013.01); *H04L 1/1671* (2013.01); *H04W 72/0406* (2013.01); *H04W 72/1263* (2013.01)

(58) Field of Classification Search
CPC ........... H04L 1/1671; H04W 72/0406; H04W 72/1263
USPC ........................................................ 370/329
See application file for complete search history.

(56) References Cited

U.S. PATENT DOCUMENTS

| | | | |
|---|---|---|---|
| 8,281,201 B2 * | 10/2012 | Kim et al. ....................... | 714/748 |
| 2008/0311919 A1 | 12/2008 | Whinnett et al. | |
| 2009/0042511 A1 | 2/2009 | Malladi | |
| 2009/0046582 A1 | 2/2009 | Sarkar et al. | |
| 2009/0073914 A1 | 3/2009 | Sun et al. | |
| 2009/0073922 A1 | 3/2009 | Malladi et al. | |
| 2009/0110038 A1 | 4/2009 | Montojo et al. | |
| 2009/0201860 A1 | 8/2009 | Sherman et al. | |
| 2010/0135181 A1 * | 6/2010 | Earnshaw et al. .............. | 370/252 |
| 2010/0190505 A1 * | 7/2010 | Shiizaki et al. ............. | 455/452.1 |

(Continued)

FOREIGN PATENT DOCUMENTS

WO    2009045139 A1    4/2009

OTHER PUBLICATIONS

Motorola, Uplink Control Signaling with Persistent Scheduling, Nov. 5-9, 2007, 3GPP TSG-RAN # 51 R1-074699.*

(Continued)

*Primary Examiner* — Shripal Khajuria
*Assistant Examiner* — Faisal Choudhury
(74) *Attorney, Agent, or Firm* — Jimmy Cheng

(57) ABSTRACT

In 3GPP LTE, the uplink ACK and CQI bits are jointly coded prior to transmission to maintain a low peak to average ratio (PAR) waveform. Further, when data needs to be transmitted, the uplink control channels are multiplexed with data prior to transmission. However, due to errors on downlink (DL) and uplink (UL) assignments, an evolved Base Node (eNB) receiver needs to employ a set of rules to decode the control channels, to minimize the number of blind decoding hypotheses. This innovation describes the rules employed by a receiver to reduce complexity and computational overhead in part by assuming that the UE is responding to grant on the downlink while providing for combinations in which one or more types of grants are not received. Energy detection in accordance with metrics and normalizing for differing power controls enables selecting the correct combination for decoding.

42 Claims, 9 Drawing Sheets

(56) References Cited

U.S. PATENT DOCUMENTS

| | | | | |
|---|---|---|---|---|
| 2010/0195575 | A1* | 8/2010 | Papasakellariou et al. | ... 370/328 |
| 2011/0026478 | A1* | 2/2011 | Lee et al. | ....... 370/329 |
| 2011/0032887 | A1* | 2/2011 | Kishiyama et al. | ...... 370/329 |
| 2011/0143766 | A1* | 6/2011 | Sun et al. | ....... 455/452.2 |
| 2011/0170514 | A1* | 7/2011 | Eriksson et al. | ....... 370/329 |
| 2012/0058730 | A1* | 3/2012 | Jitsukawa et al. | ....... 455/63.1 |
| 2013/0003681 | A1* | 1/2013 | Earnshaw et al. | ....... 370/329 |
| 2013/0044714 | A1* | 2/2013 | Kotecha et al. | ....... 370/329 |

OTHER PUBLICATIONS

Alcatel, Power Offsets to Support Data and Control Multiplexing for Persistent PUSCH, Jan. 11-15, 2008, 3GPP TSG-RAN WG1 # 52 R1-080912.*

Motorola, Uplink Control Signaling with Persistent Scheduling, Nov. 5-9, 2007, 3GPP TSA-RAN # 51 R1-074699.*

Texas Instruments, Comparison of Different ACK/NAK in CQI RS Transmission Schemes, Jan. 14-18, 2008, 3GPP TSG-RAN WG1 # 51 bis R1-080189.*

International Search Report and Written Opinion—PCT/US2010/052063, International Search Authority—European Patent Office—Apr. 1, 2011.

LG Electronics: "UL shared channel UE behaviour after ACK/NACK detection and UL synchronous", 3GPP Draft; R1-080277, UL Harq UE Behavior, 3rd Generation Partnership Project (3GPP), Mobile Competence Centre; 650, Route Des Lucioles; F-06921 Sophia-Anti Polis Cedex; France, vol. RAN WG1, No. Sevilla, Spain; Jan. 8, 2008, XP050108799, [retrieved on Jan. 8, 2008] p. 3.

Qualcomm Europe: "Details of control and data multiplexing in PUSCH", 3GPP Draft, R1-080650, 3rd Generation Partnership Project (3GPP), Mobile Competence Centre, 650, Route Des Lucioles, F-06921 Sophia-Antipolis Cedex, France, vol. RAN WGI, No. Sorrento, Italy, Feb. 6, 2008, XP050109151.

Taiwan Search Report—TW099134619—TIPO—Sep. 21, 2013.

* cited by examiner

```
┌─────────────────────────────────────────────────────────┐
│  METHODOLOGY FOR FACILITATING DECODING ACROSS MULTIPLE  │
│     CHANNELS IN A WIRELESS COMMUNICATION SYSTEM 200     │
└─────────────────────────────────────────────────────────┘
                            ↓
┌───────────────────────────────────────────────────────────────┐
│      SCHEDULING EVENT DL TRANSMITTED FROM eNB TO UE 202       │
│  ┌─────────────────────────────────────────────────────────┐  │
│  │                 UPLINK DATA GRANT 204                   │  │
│  │ ┌─────────────────────────────────────────────────────┐ │  │
│  │ │ UE USES PUSCH WHEN TX DATA (WITH/ WITHOUT CONTROL) 212 │ │  │
│  │ └─────────────────────────────────────────────────────┘ │  │
│  │ ┌────────────────────────────────────┐ ┌──────────────┐ │  │
│  │ │1st INTERVAL OF FRAME FOR MULTIPLE FRAMES 214│ │PERIODIC CQI 216│ │
│  │ └────────────────────────────────────┘ └──────────────┘ │  │
│  │ ┌─────────────────────────────────────────────────────┐ │  │
│  │ │ APERIODIC SCHEDULED OR NOT ON EITHER L2 LAYER (PDCCH) OR L3 │ │
│  │ │                 LAYER (PERSISTENT) 224              │ │  │
│  │ └─────────────────────────────────────────────────────┘ │  │
│  │ ┌─────────────────────────────────────────────────────┐ │  │
│  │ │ ACK, CQI, OR BOTH (IF APPLICABLE) MULTIPLEXED PRIOR TO DFT 226 │ │
│  │ └─────────────────────────────────────────────────────┘ │  │
│  └─────────────────────────────────────────────────────────┘  │
│                                                               │
│  ┌─────────────────────────────────────────────────────────┐  │
│  │              DL GRANT (PROMPTING ACK) 206               │  │
│  │ ┌─────────────────────────────────────────────────────┐ │  │
│  │ │   APERIODIC SCHEDULING BY L2 (PDCCH) OR L3 (PERSISTENT) 220 │ │
│  │ └─────────────────────────────────────────────────────┘ │  │
│  │ ┌─────────────────────────────────────────────────────┐ │  │
│  │ │ RB + CYCLIC SHIFT + TD SPREADING CODE 3 IMPLICITLY MAPPED BASED │ │
│  │ │             UPON PDCCH OR DL VRB INDEX 222          │ │  │
│  │ └─────────────────────────────────────────────────────┘ │  │
│  └─────────────────────────────────────────────────────────┘  │
│                                                               │
│  ┌─────────────────────────────────────────────────────────┐  │
│  │              UL CHANNEL FEEDBACK GRANT 208              │  │
│  │ ┌─────────────────────────────────────────────────────┐ │  │
│  │ │    RB + CYCLIC SHIFT + BASED ON L3 CONFIGURATION 218 │ │  │
│  │ └─────────────────────────────────────────────────────┘ │  │
│  └─────────────────────────────────────────────────────────┘  │
└───────────────────────────────────────────────────────────────┘
                            ↓
┌───────────────────────────────────────────────────────────────┐
│      UE USES PUCCH WHEN CONTROL ONLY TO UL TRANSMIT 210       │
│  ┌─────────────────────────────────────────────────────────┐  │
│  │   FOR CQI + ACK -- APERIODIC 3 RB + CYCLIC SHIFT BASED UPON CQI │
│  │                     CONFIGURATION 223                   │  │
│  └─────────────────────────────────────────────────────────┘  │
└───────────────────────────────────────────────────────────────┘
                            ↓
┌───────────────────────────────────────────────────────────────┐
│                    REDUCE BLIND DECODING 228                  │
│  ┌─────────────────────────────────────────────────────────┐  │
│  │  EIGHT POSSIBLE SCENARIOS: ACK, CQI, DATA, DATA + ACK, DATA + CQI, │
│  │             DATA + ACK + CQI, OR NONE 230               │  │
│  └─────────────────────────────────────────────────────────┘  │
│  ┌─────────────────────────────────────────────────────────┐  │
│  │         UE RESPOND OR NOT TO DL SCHEDULING EVENT 232    │  │
│  └─────────────────────────────────────────────────────────┘  │
│  ┌─────────────────────────────────────────────────────────┐  │
│  │ ASSUMPTION: UE UL RESPONSE TO CORRESPONDING PROMPT ON DL 234 │  │
│  └─────────────────────────────────────────────────────────┘  │
│  ┌─────────────────────────────────────────────────────────┐  │
│  │           PERSISTENT OR PERIODIC SCHEDULING 236         │  │
│  └─────────────────────────────────────────────────────────┘  │
└───────────────────────────────────────────────────────────────┘
                            ↓
                        ⬢ FIG. 2B ⬢
```

FIG. 2A

BLIND DECODING OF UPLINK CONTROL CHANNELS

BACKGROUND

1. Field

The present disclosure relates generally to communication, and more specifically to techniques for receiving and decoding information in a wireless communication network.

2. Background

Wireless communication systems are widely deployed to provide various types of communication content such as voice, data, and so on. These systems may be multiple access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, and orthogonal frequency division multiple access (OFDMA) systems.

Generally, a wireless multiple access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output (SISO), multiple-input-single-output (MISO), single-input-multiple-output (SIMO) or a multiple-input-multiple-output (MIMO) system.

Universal Mobile Telecommunications System (UMTS) is one of the third-generation (3G) cell phone technologies. UTRAN, short for UMTS Terrestrial Radio Access Network, is a collective term for the base nodes (Node B's) and Radio Network Controllers (RNC) which make up the UMTS core network. This communications network can carry many traffic types, from real-time Circuit Switched to IP based Packet Switched. The UTRAN allows connectivity between the UE (user equipment) and the core network. The UTRAN contains the base stations, which are called Node Bs, and RNCs. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

Third Generation Partnership Project (3GPP) LTE (Long Term Evolution) is the name given to a project within the 3GPP to improve the UMTS mobile phone standard to cope with future requirements. Goals include improving efficiency, lowering costs, improving services, making use of a new spectrum of opportunities, and better integration with other open standards. The LTE system is described in the Evolved UTRA (EUTRA) and Evolved UTRAN (EUTRAN) series of specifications. In order to provide improved communication services and increased efficiency, cellular communication systems are continuously developed and enhanced. Currently, the 3rd Generation Partnership Project (3GPP) standards body is in the process of standardizing improvements to the Universal Mobile Telecommunication System (UMTS) known as LTE.

Similarly, to advanced communication services, such as High Speed Downlink Packet Access (HSDPA) and High Speed Uplink Packet Access (HSUPA), LTE uses a very fast scheduling of communication resources allocated to user traffic and control data over the air interface. Specifically, scheduling for user traffic may be performed in the individual serving base station (eNodeB) thereby allowing scheduling to be so fast that it can follow changes in the characteristics of the propagation channels to the individual User Equipments (UEs). This is used to schedule data for UEs such that data is predominantly scheduled for UEs which currently experience advantageous propagation conditions. The fast scheduling may be performed both for uplink user data traffic transmitted on a physical channel known as the Physical Uplink Shared CHannel (PUSCH) and for downlink user data traffic transmitted on a physical channel known as the Physical Downlink Shared CHannel (PDSCH).

In LTE, the resource allocation can be changed in sub-frames having a duration of only 1 ms with a typical scheduling interval (i.e. how often the scheduling algorithm runs) of between 1 and 10 sub-frames. One frame consists of 10 such consecutive sub-frames. The PUSCH and PDSCH are shared channels wherein the scheduling is not only dependent on the current propagation conditions but also on the resource requirement of the UEs. In order to simplify the scheduling and to reduce the signaling overhead, LTE allows for persistent scheduling wherein a resource allocation for the PUSCH or PDSCH may be made for a plurality of subframes.

In order to provide efficient fast scheduling in the base station, the UE must transmit uplink control information to the scheduling base station. Specifically, the UE transmits Channel Quality Indicator (CQI) data which is indicative of the current propagation conditions for the UE. Based on the measurements of the received signal, the UE generates a CQI which may indicate a modulation scheme and data rate that is considered to be supportable by the air interface communication channel from the base station to the UE, or which may be a measure of the Signal to Noise plus Interference Ratio. As another example, LTE uses a retransmission scheme (referred to as Automatic Repeat reQuest (ARQ) or Hybrid ARQ (HARD)) and the UE transmits ARQ data in the form of uplink acknowledge (ACK) or non-acknowledge (NACK) messages which are used to determine whether individual data packets need to be retransmitted. As yet another example, LTE allows the base station to utilize adaptive antenna technology and the UE may report a Precoding Matrix Index (PMI) which is used to signal the antenna weights recommended by the UE for the individual antenna elements.

The uplink control information is transmitted using physical uplink channels. Specifically, in sub-frames wherein the UE transmits uplink user data traffic on the PUSCH, the control data is embedded within the transmission such that the control information is transmitted to the base station using the PUSCH. However, for sub-frames wherein no uplink user data traffic is transmitted on the PUSCH, the UE uses a physical uplink channel known as the Physical Uplink Control CHannel (PUCCH) to transmit the control information. Thus, the physical air interface channel used for the transmission of the control information may change for different sub-frames.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for facilitating decoding across multiple channels in a wireless communication system by employing a processor executing computer executable instructions stored on a computer readable storage medium to implement the following acts: A scheduling event is transmitted to a served device on a downlink. An encoded transmission is received from the served device on one of a plurality of uplink encoded channels. A reduced set of encoded uplink channel possibilities is determined based upon the scheduling event. Which of the reduced set of encoded uplink channel possibilities were transmitted is detected.

In another aspect, a computer program product is provided for facilitating decoding across multiple channels in a wireless communication system. At least one computer readable storage medium stores computer executable instructions that, when executed by at least one processor, implement components. A component is for transmitting a scheduling event to a served device on a downlink. A component is for receiving an encoded transmission from the served device on one of a plurality of uplink encoded channels. A component is for determining a reduced set of encoded uplink channel possibilities based upon the scheduling event. A component is for detecting which of the reduced set of encoded uplink channel possibilities were transmitted.

In an additional aspect, an apparatus is provided for facilitating decoding across multiple channels in a wireless communication system. At least one computer readable storage medium stores computer executable instructions that, when executed by at least one processor, implement components. Means are provided for transmitting a scheduling event to a served device on a downlink. Means are provided for receiving an encoded transmission from the served device on one of a plurality of uplink encoded channels. Means are provided for determining a reduced set of encoded uplink channel possibilities based upon the scheduling event. Means are provided for detecting which of the reduced set of encoded uplink channel possibilities were transmitted.

In a further aspect, an apparatus is provided for facilitating decoding across multiple channels in a wireless communication system. A processor is operatively coupled to a computer readable storage medium having stored thereon the following computer executable components: A transmitter is for transmitting a scheduling event to a served device on a downlink. A receiver is for receiving an encoded transmission from the served device on one of a plurality of uplink encoded channels. A computing platform is for determining a reduced set of encoded uplink channel possibilities based upon the scheduling event. A detector is for detecting which of the reduced set of encoded uplink channel possibilities were transmitted.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings, and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIGS. 2A-2B depict a flow diagram for a methodology or sequence of operations for facilitating decoding across multiple channels in a wireless communication system.

DETAILED DESCRIPTION

In Third Generation Partnership Project (3GPP) LTE (Long Term Evolution), the uplink ACK (acknowledge) and CQI (channel quality indicator) bits are jointly transmitted in the same resources to maintain a low peak to average ratio (PAR) waveform. Further, when data needs to be transmitted, the uplink control channels are multiplexed with data prior to transmission. However, due to errors on the downlink (DL) and uplink (UL) assignments, an evolved Base Node (eNB) receiver needs to employ a set of rules to decode the control channels and to minimize the number of blind decoding hypotheses. This innovation describes the rules employed by a receiver to reduce complexity and computational overhead, in part by assuming that the UE is responding to grant on the downlink while providing for combinations in which one or more types of grants are not received. Energy detection in accordance with metrics and normalizing for differing power controls enables selecting the correct combination for decoding.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
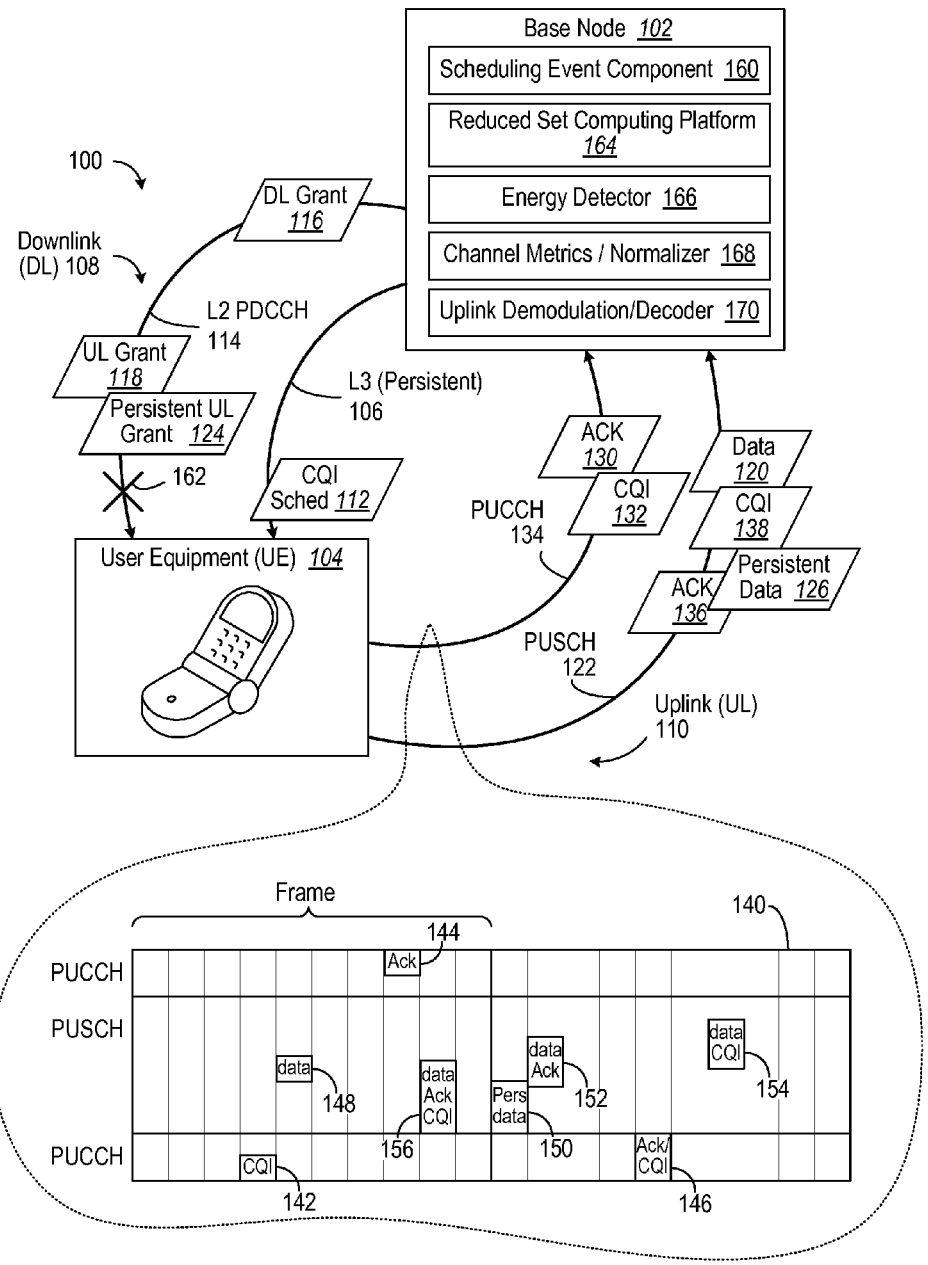
FIG. 1 depicts a block diagram of a wireless communication system in which backhaul communication between nodes is used to allocate resources using a jamming graph.

With reference to FIG. 1, a communication system 100 has a base station, such as an evolved Base Node (eNB) 102 that schedules an access terminal, depicted as user equipment (UE) 104, for wireless (i.e., over-the-air) data packet communication. To that end, on Layer 3 (L3) 106 of a downlink (DL) 108, the eNB 102 can provide a persistent (periodic) grant on an uplink (UL) 110 for reporting channel feedback, depicted as Channel Quality Indication (CQI) scheduling 112.

An L2 layer (e.g., Physical Downlink Control Channel (PDCCH) 114 can be used to send a DL grant 116 requiring the UE 104 to receive data from the eNB 102. Another scheduling event can be an UL grant 118 for the UE 104 to transmit data 120 on the UL 110, which in an exemplary aspect is on a Physical Uplink Shared Channel (PUSCH) 122. In some instances a persistent UL grant 124 is provided via L2 (PDCCH) 114 wherein the UE 104 can transmit persistent data 126 on PUSCH 122. Alternative to L3 persistent CQI scheduling 112, the eNB 102 can also use the L2 (PDCCH) 114 to request the UE to transmit an aperiodic CQI channel feedback grant.

The UE 104 is expected to acknowledge (ACK) 130 receipt of the data on the downlink as scheduled by DL grant 116. The UE 104 transmits either aperiodic or periodic CQI 132 based on L2 grant from eNB (PDCCH) 114. If the UE 104 has only control to transmit, either Ack 130 and/or CQI 132, then Physical Uplink Control Channel (PUCCH) 134 is used. As previously mentioned, PUSCH 122 is used for data 120, 126, which can entail multiplexing Ack 136 and/or CQI 138 if also supposed to be transmitted with data 120, 126.

There are several ways of multiplexing control (e.g., ACK and CQI) and data. One approach would be that PUCCH 134 resources are allocated to all UEs requesting resource of the PUSCH 122 such that a physical channel is available for transmission of CQI data even if no user data is transmitted on the PUSCH 122. However, LTE uses a Single Carrier Frequency Division Multiple Access (SC-FDMA) modulation scheme which requires all uplink transmissions to use a contiguous set of subcarriers as depicted at 140. As the PUCCH 134 is assigned to subcarriers towards the upper and lower end of the available subcarriers and the PUSCH 134 may be allocated to subcarriers which are not adjacent to the PUCCH subcarriers, it is typically not possible to have simultaneous PUSCH 122 and PUCCH 134 transmissions. Accordingly, uplink control data is transmitted together with user data on the PUSCH 122 if there is such a transmission in the subframe and is transmitted on the PUCCH 134 otherwise.

The eNB 102 can be expected to decode eight different scenarios with regard to whether an Ack, CQI or data has been prompted by a scheduling event(s) on the downlink 108. In particular, in order to address the possible combination of data and control, the UE transmits on certain resources as depicted in TABLE 1:

TABLE 1

| Scenario | Ack | CQI | Data | Resources Used |
| --- | --- | --- | --- | --- |
| 1 | No | No | Yes | Data |
| 2 | Yes | No | Yes | Data |
| 3 | No | Yes | Yes | Data |
| 4 | Yes | Yes | Yes | Data |
| 5 | No | No | No | — |
| 6 | Yes | No | No | ACK |
| 7 | No | Yes | No | CQI |
| 8 | Yes | Yes | No | CQI |

These are depicted in the time/frequency representation 140 as CQI (either aperiodic or periodic) 142, Ack 144 and Ack+CQI 146 on PUCCH 134 and by data 148, persistent data 150, data+Ack 152, data+CQI 154, data+Ack+CQI 156 on PUSCH 122.

However, such an approach can have a number of disadvantages. For example, the PUCCH resource tends to be limited but is reserved even in situations where it is not actively used. Also, as the uplink data and control may be transmitted on two different physical channels, the eNB 102 typically decodes both channels 122, 134. This results in increased latency of the decoding of the uplink control data and increases the complexity and computational demand of the base station.

Advantageously, the eNB 102 benefits from the information from a scheduling event component 160 that knows what uplink transmissions were prompted. In some instances, pathloss, interference, etc., as depicted at 162 causes the UE 104 to miss a scheduling event. The eNB 102 can benefit from a reduced set computing platform 164 that makes a guiding assumption that the UE 104 will not provide a response (i.e., data, Ack, CQI) on the uplink 110 without a corresponding prompting on the downlink 108. This reduces the set of possibilities (e.g., hypotheses) for what needs to be blind decoded. For robustness, the reduced set also contemplates that a grant was missed by the UE 104. With the reduced set determined for a particular time frame, an energy detector 166 determines whether a particular response is present in the uplink transmission from the UE 104. Since the two channels have separate power control, a channel metrics/normalizer component 168 assists in comparing the detected possibilities for determining the probable correct combination. Then an uplink demodulation/decoder 170 can utilize the information in the confirmed correct combination.

Figure 2B:
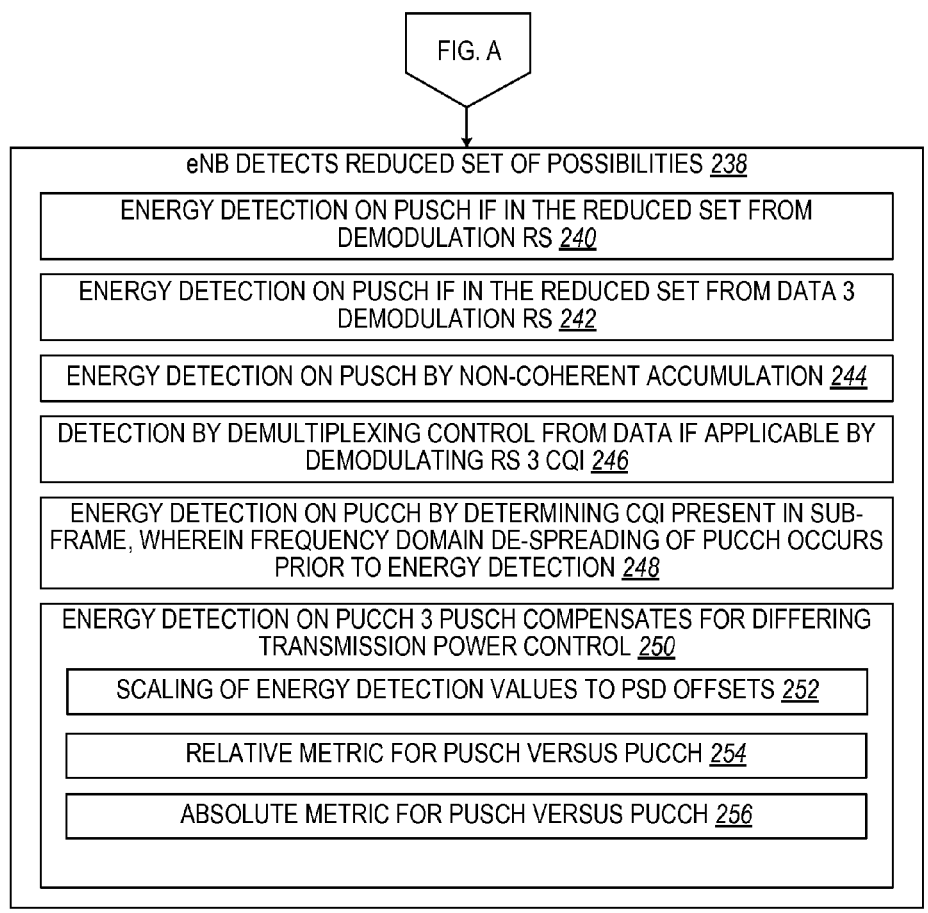

In FIGS. 2A-2B, a methodology or sequence of operations 200 is provided for facilitating decoding across multiple channels in a wireless communication system. A scheduling event is transmitted from an eNB to a served device (e.g., user equipment (UE)) on a downlink (block 202). In particular, the scheduling event can be as one or more of a group consisting of an uplink data grant (block 204), a downlink grant (block 206), and an uplink channel feedback grant (block 208). In an exemplary implementation, when the UE has control only to transmit on the uplink, the UE uses PUCCH (block 210). When the UE has data to send with or without control, the latter including Ack and/or Channel Quality Indicator (CQI)), the UE transmits on the PUSCH (block 212).

In some instances, the uplink data grant of block 204 is a persistent grant that allows the served device to transmit on the first interval of the frame for multiple frames (block 214). In addition, in some instances the uplink channel feedback grant (e.g., CQI) can be periodic rather than dynamic (block 216). For instance, periodic configuration can be achieved on L3 layer of the downlink. The CQI can be scheduled as part of a resource block (RB) with a cyclic shift based upon the L3 configuration (block 218).

Responding to a downlink scheduling grant of block 206, the UE is expected to acknowledge (ACK) if successfully received or to affirmatively indicate unsuccessful receipt (Nack) if the UE recognizes the transmission. Thus, the Ack is an aperiodic response that is dependent upon whether the downlink is scheduled or not and is scheduled by either L2 layer (Physical Downlink Control Channel (PDCCH)) or L3 (persistent) based (block 220). In an exemplary implementation, the ACK is transmitted on the uplink as part of a resource block (RB) with a cyclic shift and time domain spreading code, and implicitly mapped based upon a PDCCH or downlink virtual resource block (VRB) index (block 222).

In some instances, the scheduling event is appropriately responded to by both CQI and Ack. This combined control response is aperiodic, dependent upon whether ACK is to be transmitted or not along with a CQI. In an exemplary implementation, the CQI+Ack are transmitted by resource block (RB) with cyclic shift based upon CQI configuration (block 223).

With further reference back at block 212, data to transmit on PUSCH is aperiodic dependent upon whether uplink is scheduled or not on either L2 layer (PDCCH) or L3 layer (persistent) based (block 224). If control is to accompany data, then the data in addition to control Ack, CQI, or both is multiplexed prior to Discrete Fourier Transform (DFT) (block 226). Then, the data only, or the data multiplexed with control (Ack and/or CQI) as applicable, is transmitted on the PUSCH (block 212).

Advantageously, the receiving entity (e.g., eNB) can reduce the number of blind decoding attempts, thereby reducing device complexity and computational overhead (block 228). For a large number of served devices, this enhanced efficiency can enable expanded service or Quality of Service (QoS). Thus, the eNB need not look for each of the eight scenarios of TABLE 1: acknowledgement (ACK), channel feedback (e.g., CQI), data, data encoded with Ack, data encoded with channel feedback, and data encoded with both Ack and channel feedback, channel feedback and Ack, or none at all (block 230). In order to be robust, it is assumed that the served device can respond or fail to respond to a downlink scheduling event (block 232). In order to achieve a reduced set of possibilities, it is assumed that the served device will not respond with data, CQI or Ack unless there was a corresponding scheduling event transmitted on the downlink to prompt such a reply (block 234). The corresponding scheduling event can be substantially earlier for persistent or periodic scheduling (block 236). The reduced set also incorporates an assumption that control, if present, will comply with the downlink signaled configuration (e.g., 1- or 2-bit CQI, 8-bit CQI) It should be appreciated that twenty (20) coded bits are available on Channel Quality Indicator Channel (CQICH).

The eNB detects which of the reduced set of possibilities was transmitted on the UL (block 238). The detection can be by energy detection on PUSCH if in the reduced set from demodulation reference signals (RS) (block 240); energy detection on PUSCH from data and demodulation reference signals (RS) (block 242); or energy detection on PUSCH by non-coherent accumulation (block 244).

The detection can further include demultiplexing control from the data if applicable to the reduced set by demodulating reference signals and CQI (block 246).

Alternatively or in addition, energy detection on PUCCH if in the reduced set can include determining channel quality indication (CQI) present in a sub-frame, wherein frequency domain de-spreading of PUCCH occurs prior to energy detection (block 248).

The energy detection on the PUCCH and PUSCH can compensate for differing transmission power control (block 250). In one example, scaling of energy detection values are made with respect to power spectral density (PSD) offsets (block 252). In another example, a relative metric can be used for PUSCH versus PUCCH (block 254). In an additional example, an absolute metric can be used for PUSCH versus PUCCH (block 256).

In some aspects the teachings herein may be employed in a network that includes macro scale coverage (e.g., a large area cellular network such as a 3G (Third Generation) network, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 3:
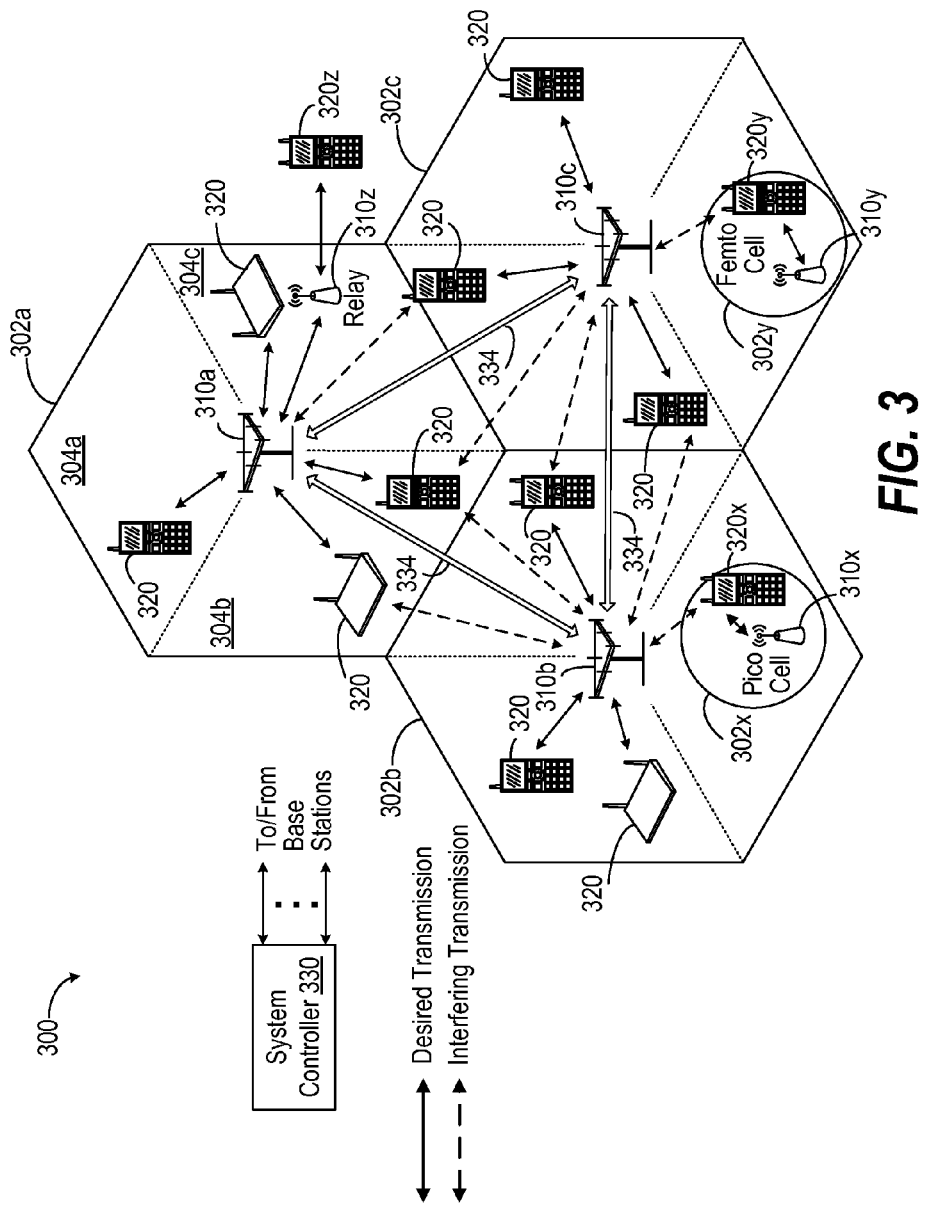
FIG. 3 depicts a block diagram of base stations serving and interfering with a population of terminals.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in a similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal or user equipment. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionalities in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system ("SISO"), a multiple-in-multiple-out ("MIMO") system, or some other type of system.

Figure 4:
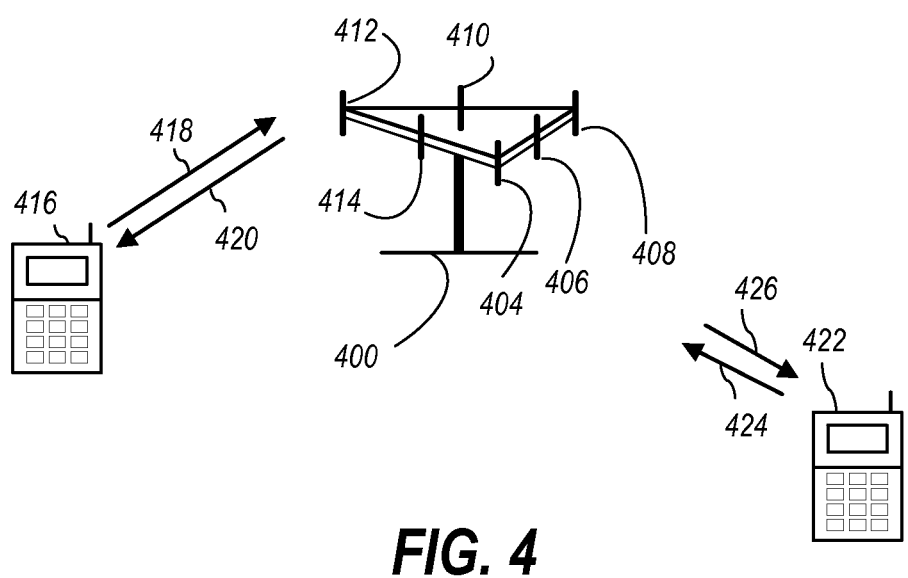
FIG. 4 depicts a block diagram of a multiple access wireless communication system.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 5:
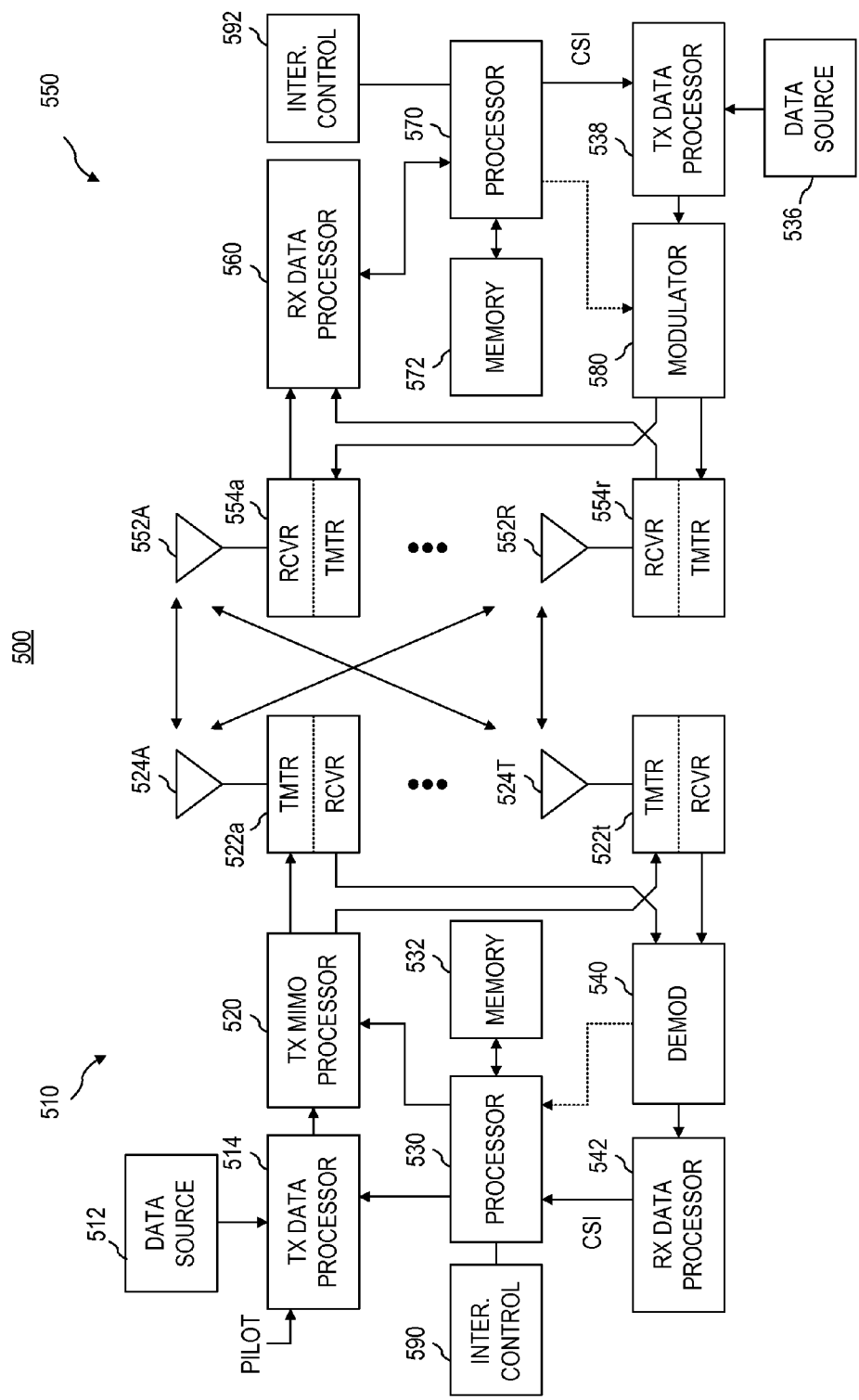
FIG. 5 depicts a block diagram of a communication system between a base station and a terminal.

The teachings herein may be incorporated into a node (e.g., a device) employing various components for communicating with at least one other node. FIG. 5 depicts several sample components that may be employed to facilitate communication between nodes. Specifically, FIG. 5 illustrates a wireless device 510 (e.g., an access point) and a wireless device 550 (e.g., an access terminal) of a MIMO system 500. At the device 510, traffic data for a number of data streams is provided from a data source 512 to a transmit ("TX") data processor 514.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides $N_T$ modulation symbol streams to $N_T$ transceivers ("XCVR") 522a through 522t that each has a transmitter (TMTR) and receiver (RCVR). In some aspects, the TX MIMO processor 520 applies beam-forming weights to the symbols of the data streams and to the antenna from which the symbol is being transmitted.

Each transceiver 522a-522t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 522a through 522t are then transmitted from $N_T$ antennas 524a through 524t, respectively.

At the device 550, the transmitted modulated signals are received by $N_R$ antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

A receive ("RX") data processor 560 then receives and processes the $N_R$ received symbol streams from $N_R$ transceivers 554a-554r based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

A processor 570 periodically determines which pre-coding matrix to use. The processor 570 formulates a reverse link message comprising a matrix index portion and a rank value portion. A data memory 572 may store program code, data, and other information used by the processor 570 or other components of the device 550.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554a through 554r, and transmitted back to the device 510.

At the device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550. The processor 530 then determines which pre-coding matrix to use for determining the beam-forming weights then processes the extracted message.

FIG. 5 also illustrates that the communication components may include one or more components that perform interference control operations. For example, an interference ("INTER.") control component 590 may cooperate with the processor 530 and/or other components of the device 510 to send/receive signals to/from another device (e.g., device 550). Similarly, an interference control component 592 may cooperate with the processor 570 and/or other components of the device 550 to send/receive signals to/from another device (e.g., device 510). It should be appreciated that for each device 510 and 550 the functionality of two or more of the described components may be provided by a single component. For example, a single processing component may provide the functionality of the interference control component 590 and the processor 530 and a single processing component may provide the functionality of the interference control component 592 and the processor 570.

Figure 6:
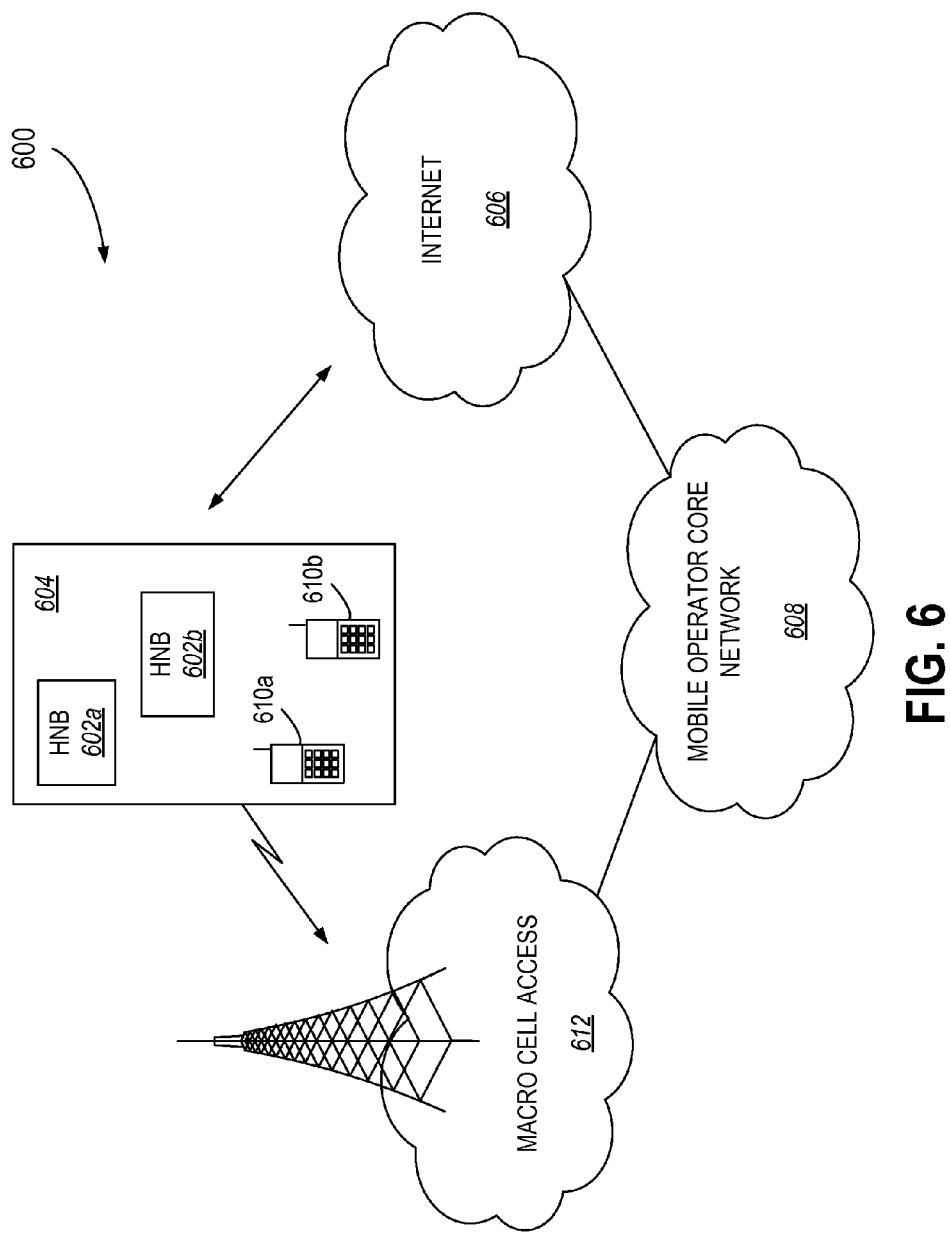
FIG. 6 depicts a block diagram of a communication system to enable deployment of access point base stations within a network environment.

FIG. 6 illustrates an exemplary communication system 600 where one or more femto nodes are deployed within a network environment. Specifically, the system 600 includes multiple femto nodes, depicted as Home Base Nodes (HNBs) 602*a* and 602*b*, installed in a relatively small scale network environment (e.g., in one or more user residences 604). Each femto node 602*a*-602*b* may be coupled to a wide area network 606 (e.g., the Internet) and a mobile operator core network 608 via a DSL router, a cable modem, a wireless link, or other connectivity means (not shown). As will be discussed below, each femto node 602*a*-602*b* may be configured to serve associated access terminals or user equipment (UE) 610*a* and, optionally, alien access UEs 610*b* (e.g., not a subscriber to a closed subscriber group). In other words, access to femto nodes 602*a*-602*b* may be restricted whereby a given UE 610*a*-610*b* may be served by a set of designated (e.g., home) femto node(s) 602*a*-602*b* but may not be served by any non-designated femto nodes 602*a*-602*b* (e.g., a neighbor's femto node 602*a*-602*b*).

The owner of a femto node 602 may subscribe to a mobile service, such as, for example, 3G mobile service, offered through the mobile operator core network 608. In addition, an access terminal or UE 610*a*-610*b* may be capable of operating both in macro environments and in smaller scale (e.g., residential) network environments. In other words, depending on the current location of the UE 610*a*-610*b*, the access terminal 610*a*-610*b* may be served by an access node or macro base node 612 of the macro cell mobile network 608 or by any one of a set of femto nodes 602 (e.g., the femto nodes 602*a*-602*b* that reside within a corresponding user residence 604). For example, when a subscriber is outside his home, he is served by a standard macro access node (e.g., node 612) and when the subscriber is at home, he is served by a femto node (e.g., node 602*a*-602*b*). Here, it should be appreciated that a femto node 602*a*-602*b* may be backward compatible with existing access terminals or UEs 610*a*-610*b*.

A femto node 602*a*-602*b* may be deployed on a single frequency or, in the alternative, on multiple frequencies. Depending on the particular configuration, the single frequency or one or more of the multiple frequencies may overlap with one or more frequencies used by a macro node (e.g., node 612).

In some aspects, an access terminal or UE 610*a*-610*b* may be configured to connect to a preferred femto node (e.g., the home femto node of the access terminal or UE 610*a*-610*b*) whenever such connectivity is possible. For example, whenever the access terminal or UE 610*a*-610*b* is within the user's residence 604, it may be desired that the access terminal or UE 610*a*-610*b* communicate only with the home femto node 602*a*-602*b*.

In some aspects, if the access terminal or UE 610*a*-610*b* operates within the macro cellular network 608 but is not residing on its most preferred network (e.g., as defined in a preferred roaming list), the access terminal or UE 610*a*-610*b* may continue to search for the most preferred network (e.g., the preferred femto node 602*a*-602*b*) using a Better System Reselection ("BSR"), which may involve a periodic scanning of available systems to determine whether better systems are currently available, and subsequent efforts to associate with such preferred systems. With the acquisition entry, the access terminal or UE 610*a*-610*b* may limit the search for specific band and channel. For example, the search for the most preferred system may be repeated periodically. Upon discovery of a preferred femto node 602*a*-602*b*, the access terminal 610*a*-610*b* selects the femto node 602*a*-602*b* for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 602*a*-602*b* that reside within the corresponding user residence 604). In some implementations, a node may be restricted to not provide, for at least one node, at least one of: signaling, data access, registration, paging, or service.

Figure 7:
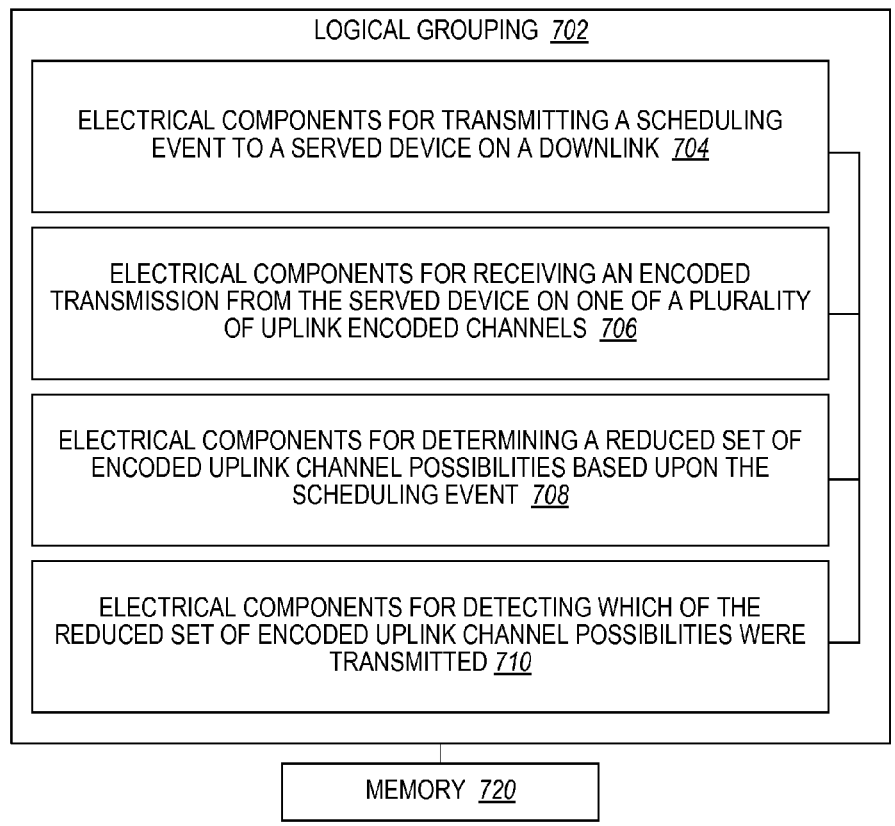
FIG. 7 depicts a block diagram for a system containing logical groupings of electrical components for facilitating decoding across multiple channels in a wireless communication system.

With reference to FIG. 7, illustrated is a system 700 for facilitating decoding across multiple channels in a wireless communication system. For example, system 700 can reside at least partially within a base station. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for transmitting a scheduling event to a served device on a downlink 704. Moreover, logical grouping 702 can include an electrical component for receiving an encoded transmission from the served device on one of a plurality of uplink encoded channels 706. Further, logical grouping 702 can include an electrical component for determining a reduced set of encoded uplink channel possibilities based upon the scheduling event 708. Logical grouping 702 can include an electrical component for detecting which of the reduced set of encoded uplink channel possibilities were transmitted 710. Additionally, system 700 can include a memory 720 that retains instructions for executing functions associated with electrical components 704-710. While shown as being external to memory 720, it is to be understood that one or more of electrical components 704-710 can exist within memory 720.

Figure 8:
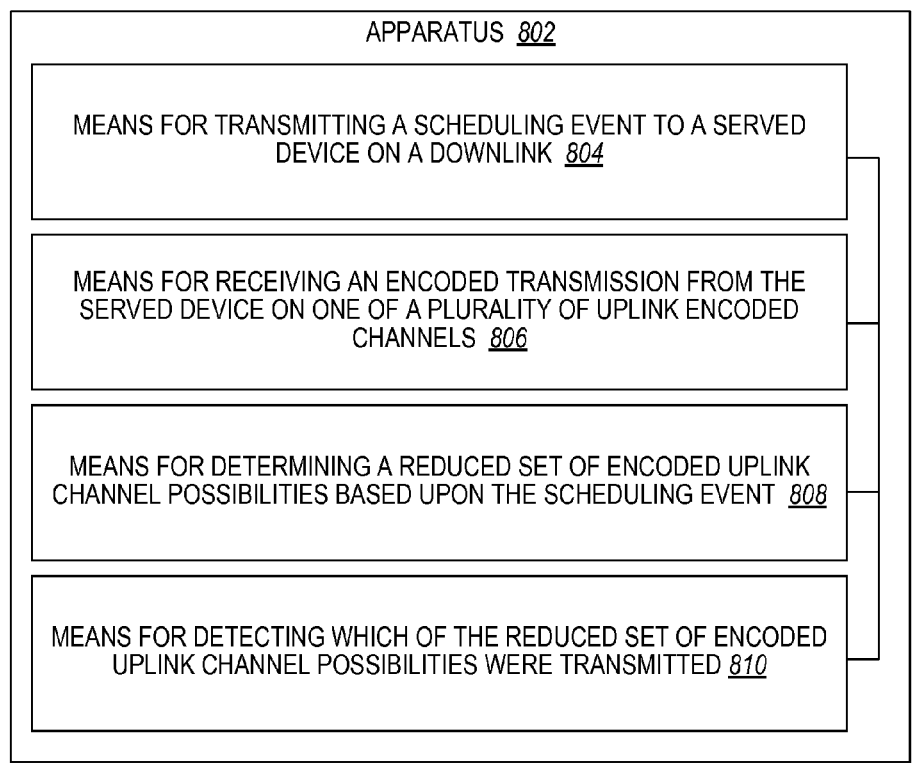
FIG. 8 depicts a block diagram for an apparatus having means for facilitating decoding across multiple channels in a wireless communication system.

With reference to FIG. 8, an apparatus 802 is provided for facilitating decoding across multiple channels in a wireless communication system. Means 804 are provided for transmitting a scheduling event to a served device on a downlink. Means 806 are provided for receiving an encoded transmission from the served device on one of a plurality of uplink encoded channels. Means 808 are provided for determining a reduced set of encoded uplink channel possibilities based upon the scheduling event. Means 810 are provided for detecting which of the reduced set of encoded uplink channel possibilities were transmitted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for facilitating decoding across multiple channels in a wireless communication system, comprising:
transmitting a scheduling event to a served device on a downlink;
receiving an encoded transmission from the served device on an encoded uplink channel, the encoded uplink channel being a control channel when the encoded transmission only includes control information;
determining a plurality of possible encoded uplink channels based upon the scheduling event, the plurality of possible encoded uplink channels being less than a total number of possible encoded uplink channels; and
detecting the encoded uplink channel from the plurality of possible encoded uplink channels based at least in part on energy detection of the encoded uplink channel.

2. The method of claim 1, wherein determining the plurality of possible encoded uplink channels comprises:
determining each combination of possible responses comprising one or more of an acknowledgement (ACK), a channel quality indicator (CQI), data, the data encoded with the ACK, the data encoded with the CQI, the data encoded with both the ACK and the CQI, or a combination thereof; and
reducing a set of combinations by obviating any combination having a transmission that is not responsive to the scheduling event.

3. The method of claim 1, further comprising transmitting the scheduling event as one or more of an uplink data grant, a downlink grant, an uplink channel feedback grant, or a combination thereof.

4. The method of claim 3, wherein the scheduling event further consists of a persistent uplink data grant.

5. The method of claim 3, further comprising:
transmitting the scheduling event as a combination of an uplink data grant, a downlink grant, and an uplink channel feedback grant; and
determining the plurality of possible encoded uplink channels based upon the scheduling event by assuming that the served device responds to at least one scheduling event and does not respond to a combination of scheduling events that were not transmitted; and
wherein detecting the encoded uplink channel from the plurality of possible encoded uplink channels comprises:
detecting uplink data on a first uplink channel;
detecting uplink data multiplexed with acknowledgement, channel feedback, or both on the first uplink channel; and
detecting uplink channel feedback on a second uplink channel.

6. The method of claim 5, wherein the uplink channel feedback grant on the second uplink channel comprises a periodic grant.

7. The method of claim 5, wherein uplink data comprises data in response to a persistent grant.

8. The method of claim 1, further comprising:
transmitting the scheduling event of an uplink data grant, a downlink grant, or an uplink channel feedback grant;
determining the plurality of possible encoded uplink channels based at least in part upon the scheduling event by assuming that the served device responds to at least one scheduling event; and
detecting uplink data on a first uplink channel;
detecting uplink data multiplexed with one or more of an acknowledgement, channel feedback, or a combination thereof on the first uplink channel; or
detecting uplink channel feedback on a second uplink channel.

9. The method of claim 8, wherein the uplink data grant comprises a persistent grant.

10. The method of claim 8, wherein the uplink channel feedback grant comprises a periodic grant.

11. The method of claim 1, wherein the energy detection is performed on a Physical Uplink Control Channel (PUCCH) and a Physical Uplink Shared Channel (PUSCH).

12. The method of claim 11, further comprising performing energy detection on the PUSCH based on demodulation reference signals.

13. The method of claim 11, further comprising performing energy detection on the PUSCH based on data and demodulation reference signals (RS).

14. The method of claim 11, further comprising performing energy detection on the PUSCH by non-coherent accumulation.

15. The method of claim 11, further comprising performing energy detection on the PUCCH in response to determining channel quality indicator (CQI) present in a sub-frame, wherein frequency domain de-spreading of the PUCCH occurs prior to energy detection.

16. The method of claim 11, further comprising performing energy detection on the PUSCH based on demodulation reference signals and channel quality indicator (CQI).

17. The method of claim 11, further comprising normalizing energy detection on the PUCCH and the PUSCH for compensating for differing transmission power control.

18. The method of claim 17, further comprising scaling energy detection values with respect to power spectral density offsets.

19. The method of claim 17, further comprising using a relative metric for the PUSCH in comparison to the PUCCH.

20. The method of claim 17, further comprising using an absolute metric for the PUSCH in comparison to the PUCCH.

21. A computer program product for facilitating decoding across multiple channels in a wireless communication system, the computer program product comprising:
a non-transitory computer-readable medium having program code recorded thereon, the program code comprising:
program code to transmit a scheduling event to a served device on a downlink;
program code to receive an encoded transmission from the served device on an encoded uplink channel, the encoded uplink channel being a control channel when the encoded transmission only includes control information;
program code to determine a plurality of possible encoded uplink channels based upon the scheduling event, the plurality of possible encoded uplink channels being less than a total number of possible encoded uplink channels; and
program code to detect the encoded uplink channel from the plurality of possible encoded uplink channels based at least in part on energy detection of the encoded uplink channel.

22. An apparatus for facilitating decoding across multiple channels in a wireless communication system, comprising:
means for transmitting a scheduling event to a served device on a downlink;
means for receiving an encoded transmission from the served device on an encoded uplink channel, the encoded uplink channel being a control channel when the encoded transmission only includes control information;

means for determining a plurality of possible encoded uplink channels based upon the scheduling event, the plurality of possible encoded uplink channels being less than a total number of possible encoded uplink channels; and means for detecting the encoded uplink channel from the plurality of possible encoded uplink channels based at least in part on energy detection of the encoded uplink channel.

23. An apparatus for facilitating decoding across multiple channels in a wireless communication system, comprising:
a memory unit; and
at least one processor coupled to the memory unit, the at least one processor being configured:
to transmit a scheduling event to a served device on a downlink;
to receive an encoded transmission from the served device on an encoded uplink channel, the encoded uplink channel being a control channel when the encoded transmission only includes control information;
to determine a plurality of possible encoded uplink channels based upon the scheduling event, the plurality of possible encoded uplink channels being less than a total number of possible encoded uplink channels; and
to detect the encoded uplink channel from the plurality of possible encoded uplink channels based at least in part on energy detection of the encoded uplink channel.

24. The apparatus of claim 23, wherein the at least one processor is further configured:
to determine each combination of possible responses comprising one or more of an acknowledgement (ACK), a channel quality indicator (CQI), data, the data encoded with the ACK, the data encoded with the CQI, the data encoded with both the ACK and the CQI, or a combination thereof; and
to reduce a set of combinations by obviating any combination having a transmission that is not responsive to the scheduling event.

25. The apparatus of claim 23, wherein the at least one processor is further configured to transmit the scheduling event as one or more of an uplink data grant, a downlink grant, an uplink channel feedback grant, or a combination thereof.

26. The apparatus of claim 25, wherein the at least one processor is further configured:
to transmit the scheduling event as a combination of an uplink data grant, a downlink grant, and an uplink channel feedback grant; and
to determine the plurality of possible encoded uplink channels based upon the scheduling event by assuming that the served device responds to at least one scheduling event and does not respond to a combination of scheduling events that were not transmitted; and
wherein the at least one processor is further configured to detect the encoded uplink channel from the plurality of possible encoded uplink channels based at least in part on:
detecting uplink data on a first uplink channel;
detecting uplink data multiplexed with acknowledgement, channel feedback, or both on the first uplink channel; and
detecting uplink channel feedback on a second uplink channel.

27. The apparatus of claim 26, wherein the uplink channel feedback grant on the second uplink channel comprises a periodic grant.

28. The apparatus of claim 26, wherein uplink data comprises a persistent grant.

29. The apparatus of claim 25, wherein the scheduling event further consists of a persistent uplink data grant.

30. The apparatus of claim 23, wherein the at least one processor is further configured:
to transmit the scheduling event of an uplink data grant, a downlink grant, or an uplink channel feedback grant;
to determine the plurality of possible encoded uplink channels based upon the scheduling event by assuming that the served device responds to at least one scheduling event, for detecting uplink data on a first uplink channel; and
to detect uplink data multiplexed with one or more of an acknowledgement a channel feedback, or a combination thereof on the first uplink channel, and to detect uplink channel feedback on a second uplink channel.

31. The apparatus of claim 30, wherein the uplink data grant comprises a persistent grant.

32. The apparatus of claim 30, wherein the uplink channel feedback grant comprises a periodic grant.

33. The apparatus of claim 23, wherein the energy detection is performed on a Physical Uplink Control Channel (PUCCH) and a Physical Uplink Shared Channel (PUSCH).

34. The apparatus of claim 33, wherein the at least one processor is further configured to detect energy on the PUSCH from demodulation reference signals.

35. The apparatus of claim 33, wherein the at least one processor is further configured to detect energy on the PUSCH from data and demodulation reference signals (RS).

36. The apparatus of claim 33, wherein the at least one processor is further configured to detect energy on the PUSCH by non-coherent accumulation.

37. The apparatus of claim 33, wherein the at least one processor is further configured to detect energy on the PUCCH in response to determining the channel quality indicator (CQI) present in a sub-frame, wherein frequency domain de-spreading of the PUCCH occurs prior to energy detection.

38. The apparatus of claim 33, wherein the at least one processor is further configured to detect energy on the PUSCH by demodulating reference signals and channel quality indicator (CQI).

39. The apparatus of claim 33, wherein the at least one processor is further configured to normalize detected energy on the PUCCH and the PUSCH for compensating for differing transmission power control.

40. The apparatus of claim 39, wherein the at least one processor is further configured to scale detected energy values with respect to power spectral density offsets.

41. The apparatus of claim 39, wherein the at least one processor is further configured to use a relative metric for the PUSCH in comparison to the PUCCH.

42. The apparatus of claim 39, wherein the at least one processor is further configured to use an absolute metric for the PUSCH in comparison to the PUCCH.

* * * * *